Nov. 5, 1929.  E. KATZINGER  1,734,731
BAKING PAN
Filed Jan. 7, 1927
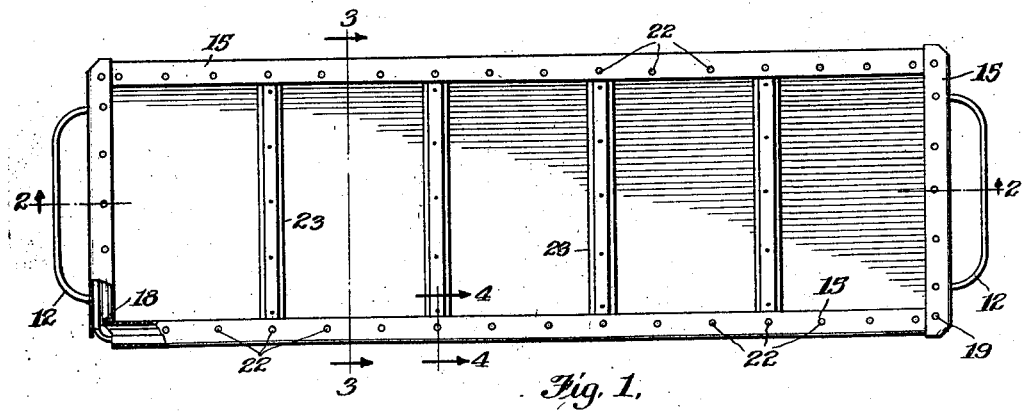
Fig. 1.
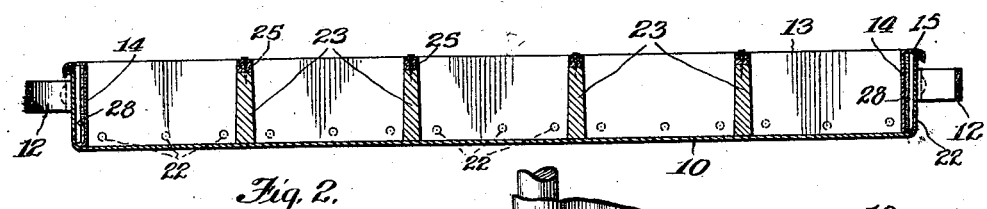
Fig. 2.
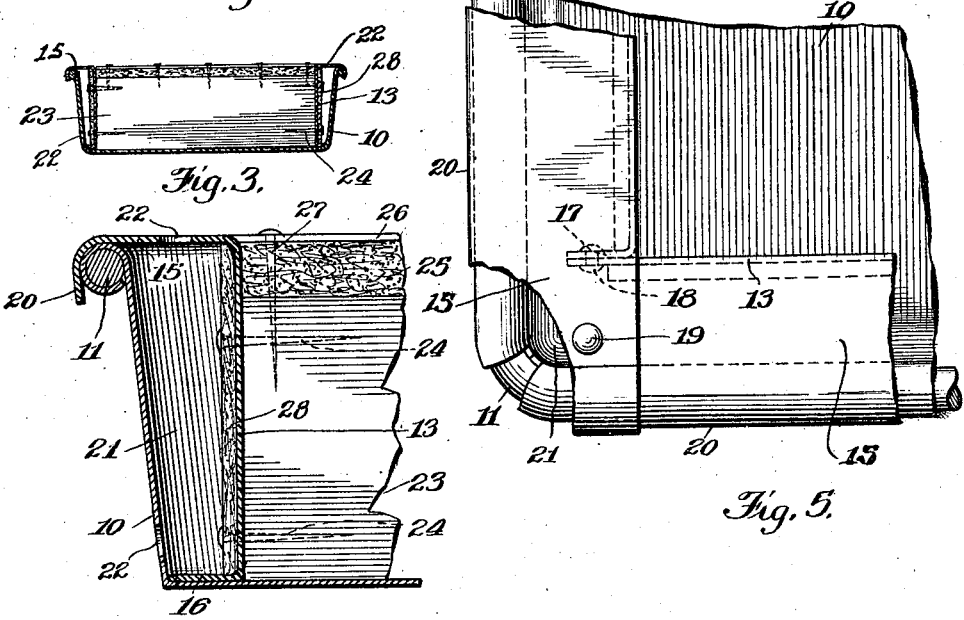
Fig. 3.
Fig. 4.
Fig. 5.
Inventor
Edward Katzinger
By Nissen & Crane
Attys.

Patented Nov. 5, 1929

1,734,731

UNITED STATES PATENT OFFICE

EDWARD KATZINGER, OF CHICAGO, ILLINOIS

BAKING PAN

Application filed January 7, 1927. Serial No. 159,516.

This invention relates to pans for baking loaves of cake, bread, or other bakery goods and has for one of its objects the provision of a pan in which formation of crust on the sides of the loaves will be controlled.

A further object is to provide a multiple bake pan having a removable frame carrying partition walls for separating the loaves.

A further object is to provide a bake pan having an air space between the sides of the pan and the loaves being baked. Other objects will appear from the following description.

In the course of baking certain articles, particularly cakes it is customary to insert a paper in the pan, place the dough in the paper and bake the paper and dough together thus making a loaf in which the bottom and sides are surrounded by paper. In preparing such an article it is desirable to have practically no crust on the bottom or sides, but to produce an attractive brown color on the top. In order to accomplish this result it is advisable to provide means for retarding the flow of heat from the oven to the sides and bottom of the loaf being baked. One of the objects of this invention is to provide equipment which accomplishes this purpose.

The invention is exemplified in the combination and arrangement of parts shown in the accompanying drawings and described in the following specification, and it is more particularly pointed out in the appended claims.

In the drawings:—

Fig. 1 is a top plan view of a pan having one embodiment of the present invention applied thereto;

Fig. 2 is a section on line 2—2 of Fig. 1;

Fig. 3 is a section on line 3—3 of Fig. 1;

Fig. 4 is a section on line 4—4 of Fig. 1, on a somewhat larger scale;

Fig. 5 is a fragmentary top plan view of one corner of the pan on a larger scale than that of Fig. 1.

In making certain classes of goods, it is sometimes desirable to avoid the formation of crusts on the sides of the loaves. This may be done by controlling the heat applied to the surfaces where it is desired to avoid formation of heavy crusts.

The portions of the pan or container in contact with these surfaces, as for example the inner frame of the pan, may be insulated in any practical manner as for example with asbestos wool or other material so as to retard the transfer of heat to the sides of the cake or other article that is being baked, and to thus retard or prevent the formation of crust on the surfaces thus protected.

Many materials may be employed to control the rate of heat transfer to the surfaces which it is desired to protect, but sheets of wood appear to be particularly suitable for this purpose. Wood, however, while possessing the desirable insulation characteristics is subject to burning or charring if exposed to the direct heat of the oven. This would, of course, materially shorten the life of the pan and to overcome this difficulty I have devised the expedient of shielding the wood wherever exposed to the direct heat of the oven by placing other insulating material which is unaffected by the heat of the oven, over the wood.

The present invention provides a pan which secures the desired results and at the same time avoids the objections heretofore encountered in pans for this purpose. At the same time the construction secures other useful results as will appear from the following description.

In the drawings, the numeral 10 designates a sheet metal pan having side and end walls and a reinforcing rod 11 extending around the top edge of the pan. This pan may be formed of black sheet iron and be of usual construction. Handles 12 may be secured to opposite ends of the pan to facilitate handling the same. A rectangular frame is arranged to fit within the pan 10 and is formed of side members 13 and end members 14. The side and end members 13 and 14 are made of sheet metal and are provided with top and bottom flanges 15 and 16 so that the side and end members are in the form of channel bars. The upright portions of the end members 14 are bent backwardly to provide flanges 17 which are secured to the projecting ends of the members 13 by rivets 18 at the corners of the frame. The top flanges 15 of the end members overlap the top flanges of the side members and the overlapping portions are secured together at the corners of the frame. These members may be joined together by rivets, or double seamed, or electrically welded. Other means for attaching them together may be employed if desired, to form a more rigid joint and to prevent separation of the overlapping parts at their edges. In this way, a rigid rectangular frame is provided which removably fits into the pan 10; the sides and ends of the frame being of channel bars having their flanges directed outwardly. The frame may be made of various materials and will be strong and rigid although made of sheet metal.

The top flanges 15 are preferably provided with downwardly extending edges 20 which overlap the beads at the top edge of the pan 10 and assist in holding the frame in its place in the pan. The bottom portions of the downwardly turned edges 20 may be bent inwardly a slight amount so that they will be sprung into place to prevent accidental displacement of the frame from the pan.

While I have described a structure which is illustrative of my invention it should be understood that I do not wish to be confined to the exact arrangement shown as there are many obvious mechanical variations possible which will fall within the scope of my invention.

One means of controlling the rate at which heat is conveyed to the sides of the loaf being baked in this pan is to provide a controlled amount of air circulation into and out of, as well as wholly within, the space formed between the inner wall and the outer wall. This space is indicated at 21 on the drawing and is shown particularly in Figs. 4 and 5.

Circulation of air within the space will proceed owing to the difference in temperature between the wall 28 and the wall 10.

Air may also flow in and out of the openings 22 which are shown located near the bottom and near the top of the air space 21. I may find it expedient to place the row of holes 22, which are shown as being located on the top of the frame 15, in the side wall 10 just below the reinforcing member 11.

It should be understood that the construction shown and described is a general arrangement which will be suitable for baking many different articles. Depending upon the nature of the materials being baked, and the various factors connected therewith, such as their ingredients, composition, etc., some articles will require a longer baking than others or some articles will require a greater amount of heat on the sides than will other articles. For this reason I may find it expedient to materially vary the number or size of holes 22 or in some cases omit them entirely.

The space within the removable frame is divided into sections for loaves by transverse partitions 23 which are preferably made of wood and which may be secured by nails, screws or other fastening means 24 extending through the side members 13 and the asbestos lining attached to said members 13. The fastening means 24 will thus serve not only to hold the wooden partitions in place but also to hold the asbestos lining in place and prevent it from collapsing and falling away from walls 13 and 23. The asbestos or other insulating material 28 may, of course, be fastened in any other desired manner by separate or individual fastenings usually employed for this purpose.

The partition walls 23 may be somewhat thicker at their bottoms than at their tops to facilitate removal of the baked loaves from between the partitions. A covering of heat resisting material 25, such as asbestos, is placed over the top edges of the partition walls 23 and a strip of metal 26 covers the top of the asbestos 25 to assist in holding it in place. Fastening devices 27 extend downwardly through the metal strip 26 and asbestos 24 into the partition walls 23. The partition walls 23, being made of wood, are less conducive of heat than the metal bottom of the pan so that the sides of the loaves contacting the partition walls 23 will be protected against formation of heavy crusts. All of the lateral faces of the loaves will therefore be partially protected from the heat, either by the wooden partition walls or the air space surrounding the rectangular frame member. The faces of the wooden partitions 23 are protected against charring by the loaves themselves while the top edge is covered by the protecting layer of asbestos. The outer sides of the frame, being made of metal, are not subject to charring action by the heat of the ovens. If the partitions should be damaged or charred, they may be readily removed and replaced by new wooden parts. Since the rectangular frame is removable, ready access may be had to the outer faces of the side walls 13 to permit withdrawal of the fasteners 24 and insertion of new fasteners for holding the new partitions. The removability of the partition frame also greatly facilitates cleaning and straightening of any parts that may become dented, as well as other repairs.

The outer edges of the bottom flanges 16 engage the inner walls of the pan 10 and prevent any outward movement of the side walls 13 and end walls 14. This holds the bottom edges of these walls firmly in place so that they will not yield to pressure within the baking compartments. The side walls 13 and end walls 14 may be provided on their outer faces with a layer of asbestos 28 to further protect the cake or loaf from heat at the sides thereof.

I claim:—

1. The combination with a baking pan, of a frame removably fitting the interior of said pan, said frame comprising walls spaced inwardly from the walls of said pan, and means for closing the spaces between the walls of said pan and frame at the top and bottom of said spaces to provide air chambers surrounding said frame within said pan.

2. The combination with a baking pan, of a frame disposed within said pan and comprising upright walls spaced inwardly from the side walls of said pan, and means for covering the space between the walls of said frame and pan at the top and bottom of said frame to provide air space surrounding the sides of said frame within said pan, said covering means having perforations therein for circulation of air.

3. The combination with a baking pan, of a frame removably fitting the interior of said pan, said frame comprising channel members having outwardly directed top and bottom flanges, said channel members being secured together at the corners of said frame.

4. The combination with a baking pan, of a frame removably fitting the interior of said pan, said frame comprising channel members having outwardly directed top and bottom flanges, said channel members being secured together at the corners of said frame, and wooden partitions carried by said frame for dividing the space within said frame into compartments.

5. The combination with a baking pan, of a frame fitting within said pan, said frame comprising sheet metal side and end channel members and having outwardly directed top and bottom flanges, said channel members being secured together at the corners of said frame, the top flanges of said channel members having downwardly bent edges arranged to fit over the top edges of the sides and ends of said frame.

6. The combination with a baking pan, of a frame removably fitting the interior of said pan, said frame comprising side and end sheet metal channel members having top and bottom flanges projecting outwardly, the top flanges of said channel members having downwardly bent edges arranged to fit over the top edges of the sides and ends of said pan, and wooden partitions secured to the inner faces of said channel members and dividing the sides within said frame into compartments.

7. The combination with a baking pan, of a metallic frame arranged within said pan and having side and end walls spaced inwardly from the side and end walls of said pan respectively to provide air space between said pan and frame, wooden partitions extending across said frame and dividing the space within said frame into compartments, and heat resisting material disposed on the upper edges of said partitions.

8. The combination with a baking pan, of a metal frame having side and end walls formed of channel members provided with outwardly projecting upper and lower flanges, said channel members being secured together at the corners of said frame, the upright walls of said pan being spaced inwardly from the walls of said pan while the upper flanges of said channels bridge the space between the walls of said pan and the upright portions of said channels, said upper flanges being perforated and having their outer edges bent downwardly over the top edges of the side walls of said pan.

9. The combination with a baking pan, of a frame removably fitted within said pan, said frame comprising metallic channel members having outwardly extending top and bottom flanges, said channel members being secured together at the corners thereof and spaced inwardly from the sides of said pan to provide an air space between said frame and the sides of said pan, wooden partitions extending across said frame to divide the space therein into compartments, and heat resisting means covering the top edges of said partitions.

10. A baking pan having a compartment provided with spaced outer side walls forming an air pocket adjacent the outer side of said compartment, the inner one of said side walls having a layer of heat insulating material on its outer face, said air pocket having upper and lower passages communicating therewith to facilitate circulation of air through said pocket.

11. The combination with a baking pan, of sheet metal wall members spaced inwardly from the sides of said pan to provide air pockets about the outer portion of said pan, a covering of heat insulating material on the outer faces of said sheet metal wall and wooden partitions for separating the space within said pan into compartments.

12. The combination with a baking pan, of a frame disposed within said pan, said frame having side walls and means projecting radially therefrom in spaced relation for holding said side walls in fixed spaced relation to the sides of the frame to provide an air space about the periphery of said pan.

13. The combination with a baking pan, of a frame disposed within said pan, said frame having side walls, and a peripheral flange at the bottom of said frame for holding the latter in fixed spaced relation to the inside walls of said pan.

14. The combination with a baking pan having a wired rim, of a frame having spaced partitions adapted to engage the bottom of said pan, a bottom peripheral flange for said frame to fit the bottom of said pan, and a top peripheral flange for said frame adapted to be detachably connected to the said wired rim.

15. A partitioning frame for bake pans comprising an open frame having spaced partitions extending transversely thereof, a bottom peripheral flange, and a top peripheral flange.

16. A partitioning frame for bake pans comprising a metal frame, spaced wooden partitions forming compartments open at their tops and bottoms, and heat resisting material disposed on the upper sides of said partitions.

17. The combination with an open partitioning structure having spaced partitions forming compartments open at their tops and bottoms, of a bake pan for receiving said partitioning structure with the bottom of said pan forming the bottoms of said compartments, and means for mounting said structure in said pan to form a peripheral air space between said structure and the interior walls of said pan.

18. The combination with a bake pan having ventilating openings in the walls thereof, of a compartment frame, and a top flange for spacing said frame from the inner walls of said pan, said top flange having ventilating openings co-operating with the ventilating openings in the walls of said pan.

19. The combination with a sheet metal bake pan, of a sheet metal frame within said pan and spaced from the walls thereof, a covering of heat insulating material on the side and end walls of said frame, spaced partitions of heat insulating material between the side walls of said frame, and means for mounting said frame in said pan to afford an air space surrounding the said frame.

20. The combination with a baking pan having a wire rim, of a frame disposed within said pan, a horizontal peripheral flange at the upper end of said frame, a downwardly extending peripheral extension on said flange in position to fit over said wire rim to hold said frame in fixed spaced relation to the inner walls of said pan, and a horizontal peripheral flange at the lower edge of said frame in position to rest on the bottom of said pan.

21. The combination with a baking pan having a rim, of a frame disposed within said pan, a top peripheral flange on said frame, a downward extension from said flange to fit over said rim to detachably mount said frame in said pan and hold the same spaced from the inner walls of said pan, and a horizontal peripheral flange at the lower edge of said frame in position to engage the inner wall of said pan.

22. The combination with a baking pan having a rim, of a frame disposed within said pan, a top peripheral flange on said frame in position to rest on the rim of said pan, and a bottom peripheral flange on said frame in position to rest on the bottom of the pan and engage the inner wall thereof to hold the said frame spaced from such inner wall.

23. A partitioning frame for a bake pan comprising an open frame, spaced partitions for said frame permanently connected between opposite walls of said frame to form compartments without bottoms, and means adapting said frame and said permanently connected partitions to be mounted in a pan to afford compartments with the bottom of the pan serving as the bottoms of said compartments.

24. The combination with a bake pan, of a compartment frame with its lower side adapted to rest on the bottom of the pan with the outer walls of the frame in spaced relation with the inner walls of said pan, and a top perpiheral flange extending outwardly from the peripheral edge of said frame over the rim of said pan with ventilating openings in said flange distributed around the peripheral space between the outer walls of the frame and the inner walls of the pan.

In testimony whereof I have signed my name to this specification on this third day of January A. D. 1927.

EDWARD KATZINGER.